United States Patent [19]

Privratsky

[11] Patent Number: 5,042,198
[45] Date of Patent: Aug. 27, 1991

[54] HINGE ATTACHMENT FOR A GATE
[76] Inventor: Steven M. Privratsky, Rte. 2, Box 49, Mott, N. Dak. 58646
[21] Appl. No.: 586,265
[22] Filed: Sep. 21, 1990
[51] Int. Cl.⁵ .......................................... E05D 15/28
[52] U.S. Cl. ...................................... 49/248; 16/366
[58] Field of Search ............... 49/248, 249, 246, 261, 49/208, 381; 16/366, 365

[56] References Cited
U.S. PATENT DOCUMENTS
1,224,036 4/1917 Sutton ................................... 16/366
1,331,836 2/1920 Wilbanks ............................. 49/246
1,841,898 1/1932 Lehman ................................ 16/366
2,277,176 3/1942 Wagner ................................ 16/366

Primary Examiner—Philip C. Kannan
Attorney, Agent, or Firm—Zarley McKee Thomte Voorhees & Sease

[57] ABSTRACT

A hinge attachment for use with a conventional farm or corral gate which is positioned between the outer end of the gate and the supporting gate post. The hinge attachment permits the gate to be pivoted approximately 360° with respect to the supporting gate post.

6 Claims, 4 Drawing Sheets

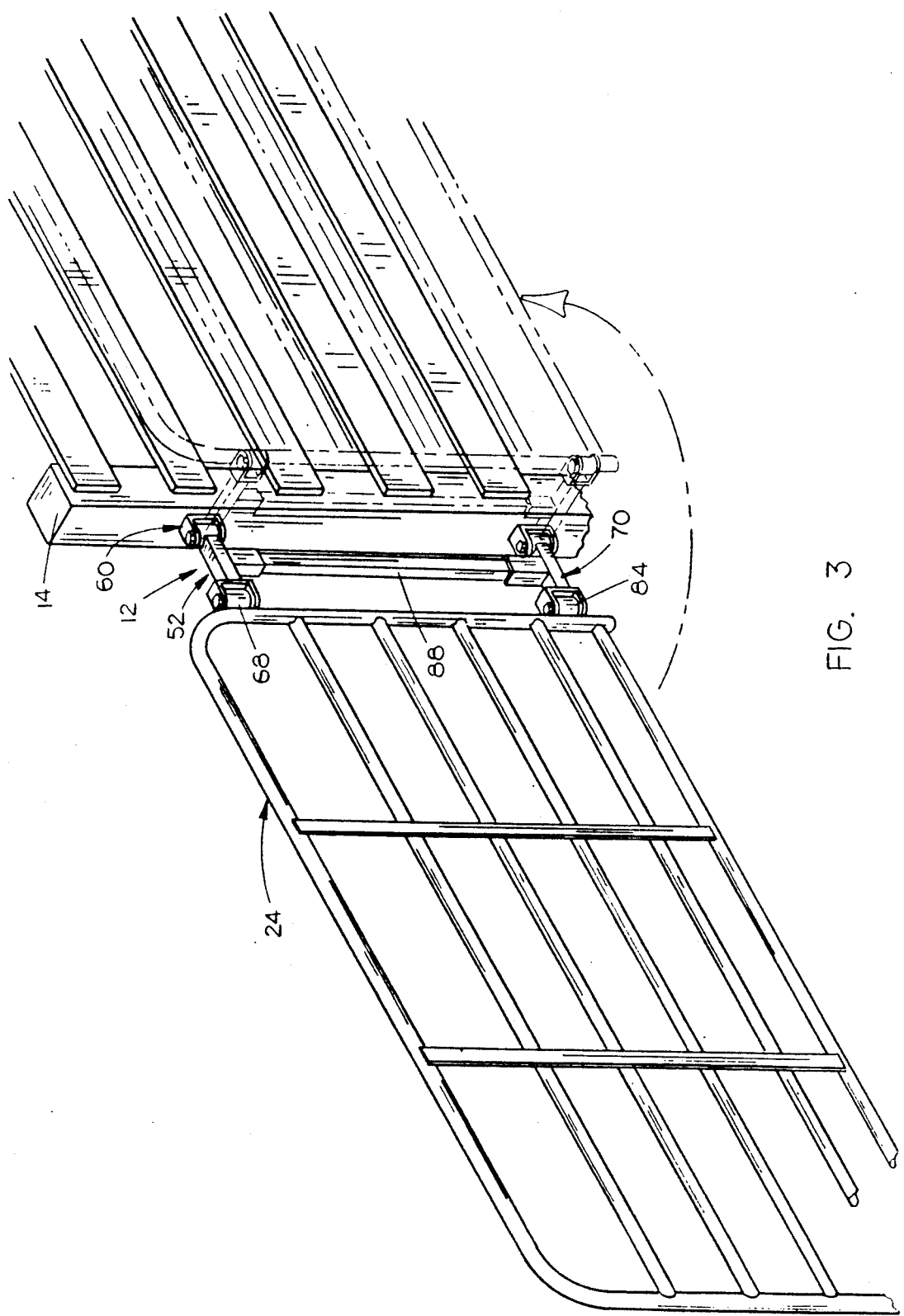

HINGE ATTACHMENT FOR A GATE

BACKGROUND OF THE INVENTION

This invention relates to a hinge attachment for a gate and more particularly to a hinge attachment which permits a farm or corral gate to be swung in approximately 180° in either direction or approximately 360°.

Conventional farm gates or corral gates comprise a vertically disposed wood gate post having either a pair of pintles secured thereto or a pair of brackets secured thereto. The inner end of the gate is pivotally mounted on the pintles or the brackets to permit the gate to be pivoted relative to the gate post. However, the gate post itself limits the amount of pivotal movement permitted the gate since the gate can only pivot on its respective pintles or brackets until the gate engages the post. The fact that the gate cannot be completely opened makes it difficult to maintain the gate in an open position without extending rope, wire or the like between the gate and the fence or placing some sort of block in the path of the gate to prevent it from swinging to its closed position.

It is therefore a principal object of the invention to provide a hinge attachment for a gate which permits the gate to pivot practically 360° with respect to the supporting gate post.

A further object of the invention is to provide a hinge attachment for a gate which is imposed between the conventional pintles or brackets on the gate post and the hinge end of the gate without modifying either the gate post pivots or the gate itself.

Yet another object of the invention is to provide a hinge attachment for a gate which includes a vertical adjustment so that the attachment may be utilized on gates wherein the distance between the pivots thereon varies.

Still another object of the invention is to provide a hinge attachment for a gate which is economical of manufacture, durable in use and refined in appearance.

These and other objects will be apparent to those skilled in the art.

BRIEF DESCRIPTION OF THE DRAWINGS

FIG. 3 is a perspective view of one form of the hinge attachment of this invention:

SUMMARY OF THE INVENTION

Figure 2:
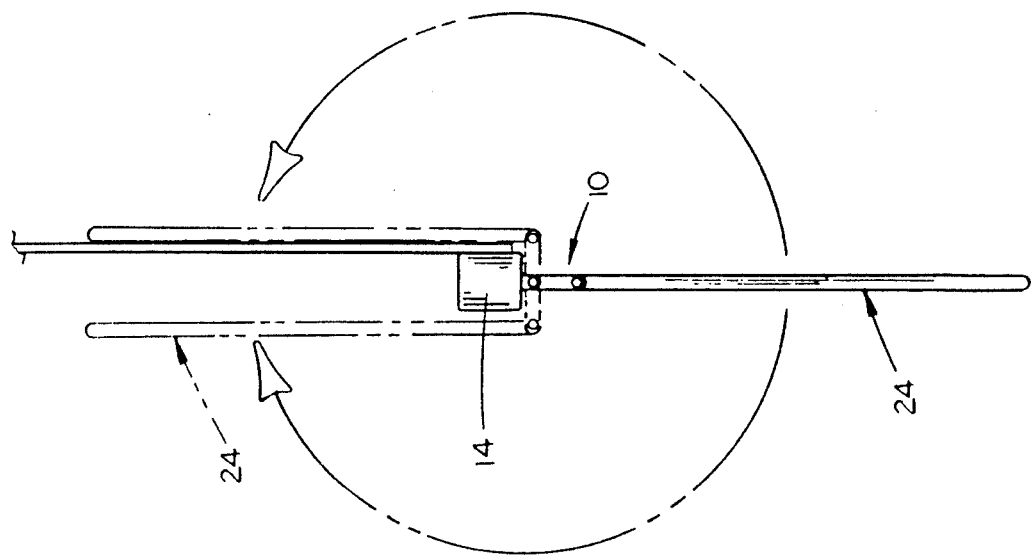
FIG. 2 is a top view of a gate having the hinge attachment of this invention mounted thereon.

A hinge attachment is described for use with conventional farm or corral gates. The gate is removed from its supporting structure on the gate post and the hinge attachment is positioned between the inner end of the gate and the fence post. The hinge attachment comprises upper and lower supports having inner and outer ends and a shaft secured thereto and extending therebetween. The inner end of each of the upper and lower supports has means thereon adapted to be mounted on the pintles or brackets on the gate post. The outer end of each of the supports has means thereon to permit the attachment thereof to the inner end or hinge end of the gate. The hinge attachment permits the gate to be opened approximately 360° with respect to the supporting gate post.

DESCRIPTION OF THE PREFERRED EMBODIMENT

In the drawings, the numerals 10 and 12 refer to two versions of the hinge attachment of this invention. Hinge attachment 10 is designed to be used on one style of gate post and gate arrangement while attachment 12 is designed to be used on a different style of gate post and gate.

Figure 1:
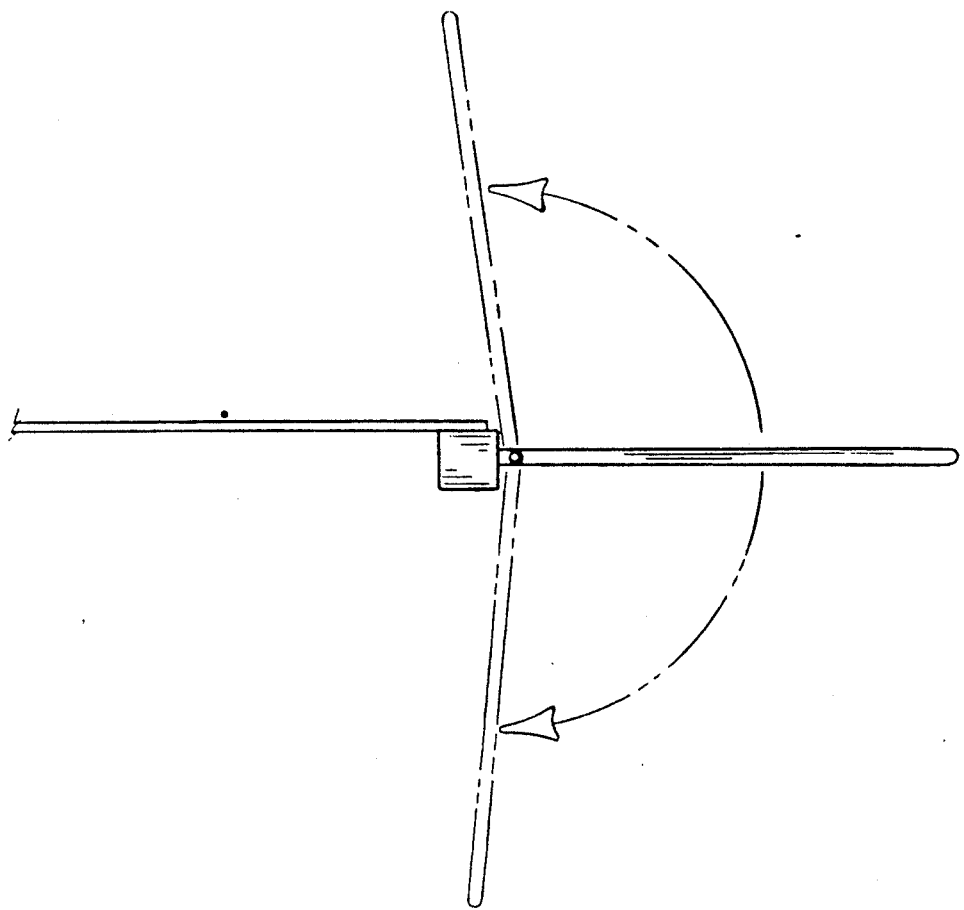
FIG. 1 is a top view of a prior art gate which illustrates the limited movement provided to the gate.
Figure 4:
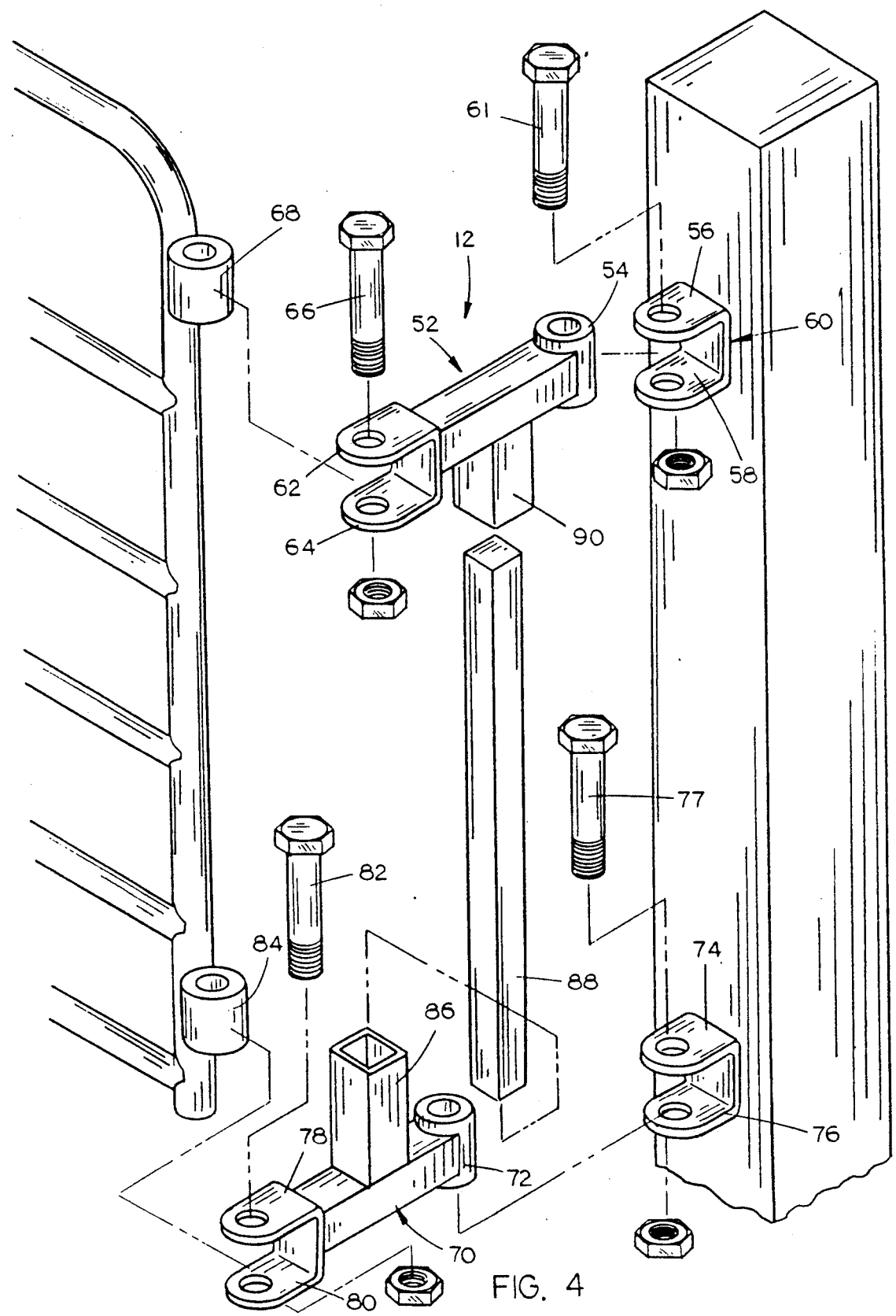
FIG. 4 is an exploded perspective view of the hinge attachment of FIG. 3.
Figure 5:
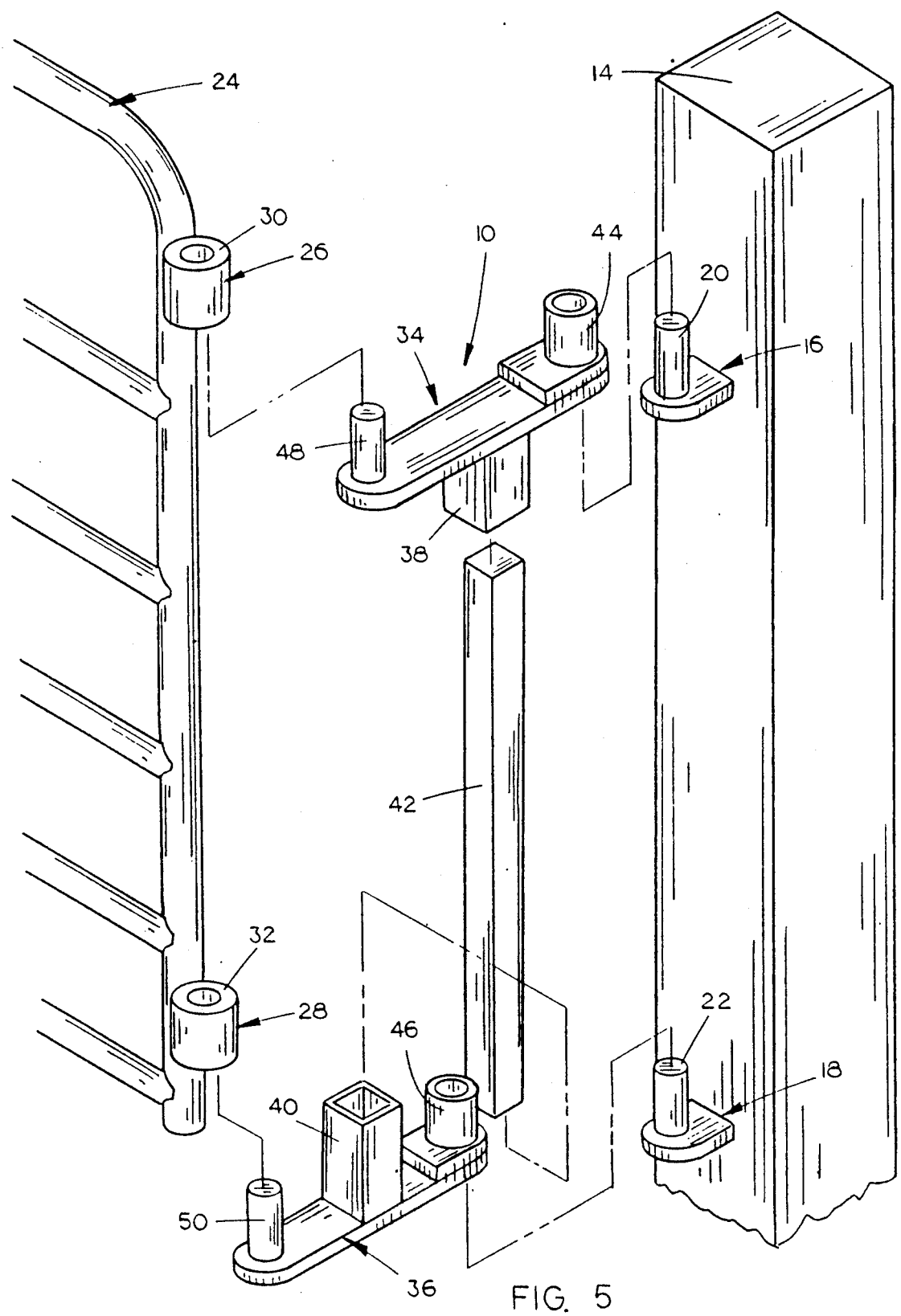
FIG. 5 is an exploded perspective view of a modified form of the hinge attachment.

Hinge attachment 10 is designed to be utilized with a wood gate post 14 having a pair of pintles 16 and 18 embedded therein and including upstanding pivot pin portions 20 and 22 portions respectively. Gate 24 is of conventional design and includes a pair of vertically adjustable brackets 26 and 28 secured to the inner end thereof which have tubular portions 30 and 32 provided thereon. The tubular portions 30 and 32 are normally pivotally mounted on the pivot pin portions 20 and 22 of the pintles 16 and 18. However, in such a gate arrangement, the gate can only swing in different directions until the gate engages or strikes the post itself such as illustrated in FIG. 1. The use of hinge attachment 10 between the post 14 and the gate 24 permits the gate to be swung approximately 360° with respect to the post as illustrated in FIG. 2.

Hinge attachment 10 comprises upper and lower supports 34 and 36 having inner and outer ends. A square tube 38 is welded to the underside of upper support 34 while a square tube 40 is welded to the upper surface of lower support 36. Square shaft 42 is slidably received in the tubes 38 and 40 to give support to the attachment and to permit the upper and lower supports 34 and 36 to be moved away from one another while still being connected by means of the shaft 42 in those situations where the pintles on the post 14 are not spaced-apart the exact distance between the upper and lower supports. In other words, one farmer or rancher could mount the pintles on the post 14 approximately 37-inches apart while another farmer or rancher could mount the pintles on the post 14 approximately 39-inches or more apart. The slidable connection of the shaft 42 in the tubes 38 and 40 permits the attachment to compensate for varying pintle placements.

The inner end of upper support 34 has a pipe 44 secured thereto which is adapted to be received on the pivot pin portion 20. Lower support 36 has a pipe 46 mounted thereon which is adapted to be pivotally mounted on the pivot pin portion 22. The outer end of upper support 34 has an upstanding shaft 48 mounted thereon which is adapted to receive tubular portion 30 of bracket 26. Similarly, lower support 36 is provided with an upstanding shaft 50 which is adapted to pivotally receive tubular portion 32 of bracket 28.

As seen in the drawings, when the hinge attachment 10 of this invention is imposed between the gate 24 and the gate post 14, the attachment effectively moves the inner end of the gate laterally with respect to the post so that the gate will not be limited in its pivotal movement by the gate post itself. It can be seen in the drawings (FIG. 2) that the hinge attachment 10 of this invention permits the gate to be pivoted approximately 360° with respect to the gate post. When pivoted to a completely open position on either side of the fence, the gate may be conveniently secured to the fence or corral to maintain the gate in its open position.

Hinge attachment 12 is identical to hinge attachment 10 except that it is adapted to be used on those gates not employing pintles. As seen in the drawings, the upper support 52 includes a pipe 54 which is adapted to be received between the ears 56 and 58 of the bracket 60 and pivotally secured thereto by pin or bolt. The outer end of upper support 52 is provided with a pair of spaced-apart ears 62 and 64 adapted to have a pivot pin or bolt 66 extending therethrough and through the tubular member 68 at the upper inner end of the gate.

The lower support 70 of hinge attachment 12 includes a pipe 72 which is adapted to be received between the ears 74 and 76 and pivotally secured thereto by means of pin or bolt 77. The outer end of lower support 70 is provided with a pair of spaced-apart ears 78 and 80 adapted to have a pivot pin or bolt 82 extending therethrough and through the tubular member 84 at the lower inner end of the gate. Square tube 86 is secured to and extends upwardly from lower support 70 and is adapted to vertically adjustably receive the lower end of shaft 88. The upper end of shaft 88 is selectively vertically received in the square tube 90 which is secured to and which extends downwardly from the upper support 52. Hinge attachment 12 works in an identical fashion to hinge attachment 10. Thus it can be seen that the invention accomplishes at least all of its stated objectives.

I claim:

1. In combination,
   a vertically disposed gate post having one side thereof facing the gate opening,
   at least a pair of vertically spaced gate supports secured to said gate post at said one side thereof,
   a gate attachment pivotally mounted on said gate supports about vertical axis,
   a gate having inner and outer ends,
   said gate having at least a pair of vertically spaced pivot brackets secured to its inner end which normally would be pivotally connected to said gate supports on said gate post,
   said pivot brackets of said gate being pivotally secured to said gate attachment,
   said gate attachment permitting said gate to swing approximately 360° with respect to said gate post,
   said gate attachment comprising elongated, upper and lower horizontally disposed support having inner and outer ends, and a vertically disposed shaft means secured to said upper and lower supports and extending therebetween.

2. The combination of claim 1 wherein said upper and lower supports are vertically slidably mounted on said shaft means.

3. The combination of claim 1 wherein said upper support has a square tube secured thereto which extends downwardly therefrom, said lower support having a square tube secured thereto which extends upwardly therefrom, said shaft means comprising a square shaft positioned in said square tubes and extending therebetween.

4. The combination of claim 1 wherein said gate post is comprised of wood and wherein said gate supports are pintles embedded into said gate post, each of said pintles including an upstanding pivot pin, said upper and lower supports having hollow tubular portions at their inner ends which pivotally receive said pivot pins; said upper and lower supports each having a pivot pin at its outer end which is pivotally secured to the gate.

5. The combination of claim 1 wherein said gate post is comprised of wood and wherein said gate supports are brackets secured to said gate post, each of said brackets including a pair of vertically spaced ears having a pin means extending therebetween, each of said upper and lower supports having its inner end pivotally mounted on one of said pin means, and means on the outer end of each of said upper and lower supports which are pivotally secured to the pivot brackets on said gate.

6. In combination with a vertically disposed gate post having one side thereof facing the gate opening and having at least upper and lower gate supports secured thereto at one side thereof, comprising,
   a gate attachment pivotally mounted on said gate supports about a vertical axis,
   a gate having inner and outer ends,
   said gate having at least upper and lower pivot brackets secured to its inner end which normally would be pivotally connected to said upper and lower gate supports on said gate post,
   said pivot brackets of said gate being pivotally secured to said gate attachment,
   said gate attachment permitting said gate to swing approximately 360° with respect to said gate post,
   said gate attachment comprising upper and lower members pivotally secured, about a vertical axis, to said upper and lower pivot brackets,
   and a vertically disposed support member operatively secured to and extending between said upper and lower members.

* * * * *